(No Model.) 4 Sheets—Sheet 1.

A. ANDERSON.
CHECK ROW CORN PLANTER.

No. 313,466. Patented Mar. 10, 1885.

Witnesses:
P. R. Richards.
T. F. Holden.

Inventor:
Abraham Anderson,
By W. B. Richards,
Atty.

(No Model.)  4 Sheets—Sheet 2.

A. ANDERSON.
CHECK ROW CORN PLANTER.

No. 313,466. Patented Mar. 10, 1885.

Witnesses:
S. R. Richards.
T. F. Holden

Inventor:
Abraham Anderson,
By W. B. Richards,
Atty.

(No Model.) 4 Sheets—Sheet 3.
A. ANDERSON.
CHECK ROW CORN PLANTER.

No. 313,466. Patented Mar. 10, 1885.

Witnesses:
S. R. Richards
I. F. Holden

Inventor:
Abraham Anderson,
By W. B. Richards,
Atty.

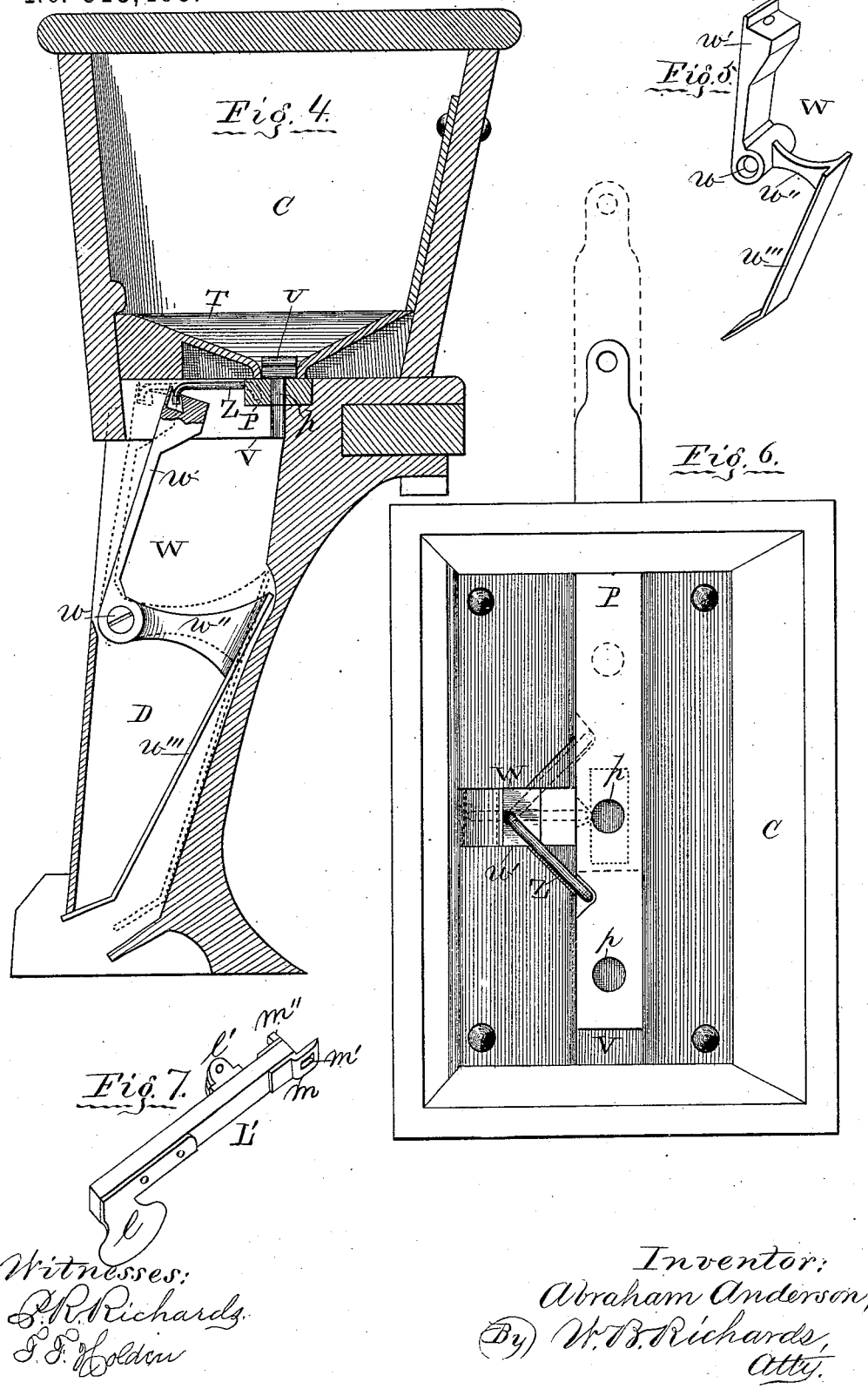

UNITED STATES PATENT OFFICE.

ABRAHAM ANDERSON, OF GALESBURG, ILLINOIS, ASSIGNOR TO C. S. COLTON, G. D. COLTON, AND F. COLTON, ALL OF SAME PLACE.

CHECK-ROW CORN-PLANTER.

SPECIFICATION forming part of Letters Patent No. 313,466, dated March 10, 1885.

Application filed June 2, 1883. (No model.)

*To all whom it may concern:*

Be it known that I, ABRAHAM ANDERSON, a citizen of the United States, residing at Galesburg, in the county of Knox and State of Illinois, have invented a certain new and useful Improvement in Corn-Planters; and I do hereby declare the following to be a full, clear, and exact description of the invention, such as will enable others skilled in the art to which it appertains to make and use the same, reference being had to the accompanying drawings, which illustrate my invention, and in which—

Figure 1:
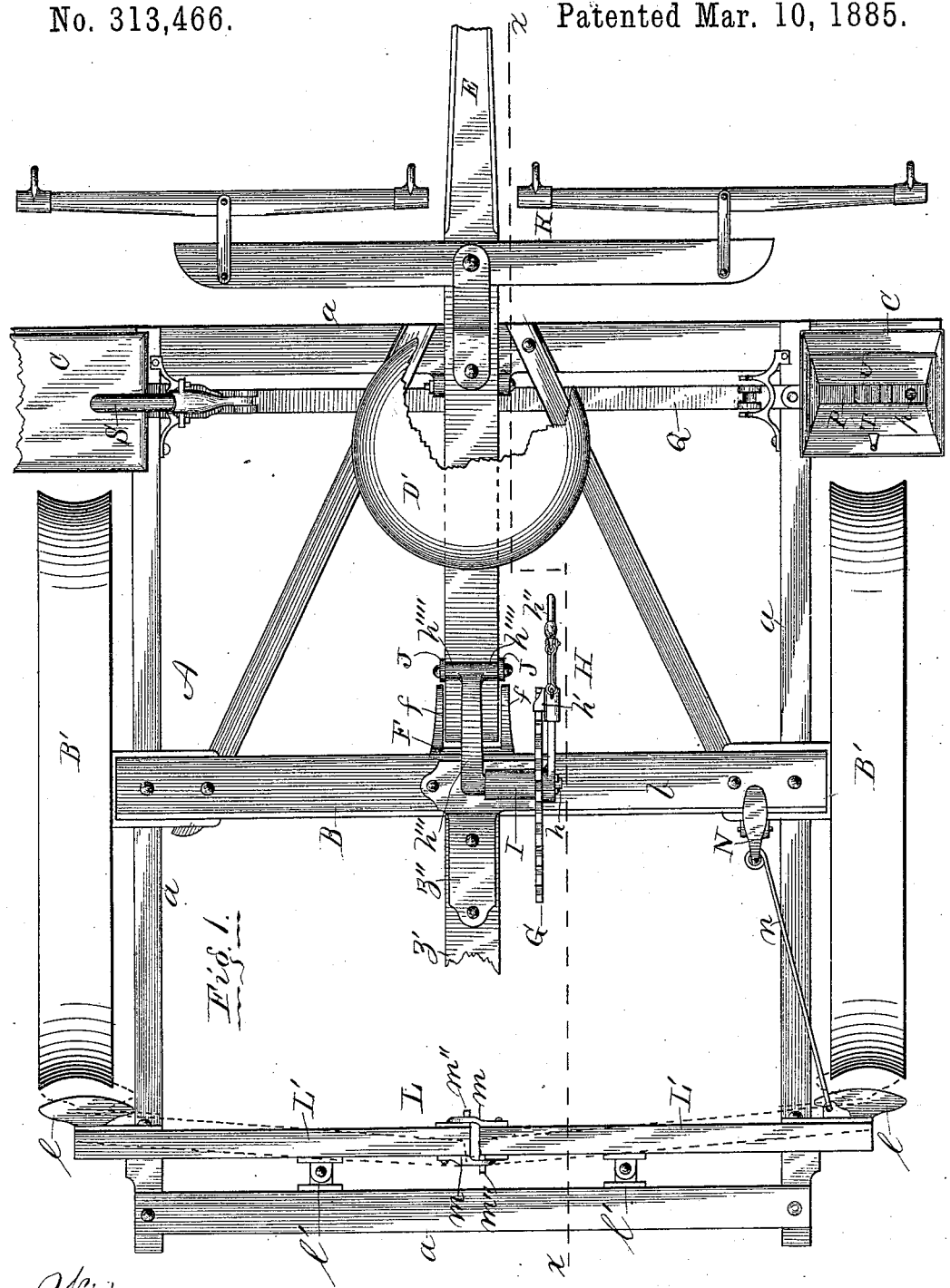
Figure 2:
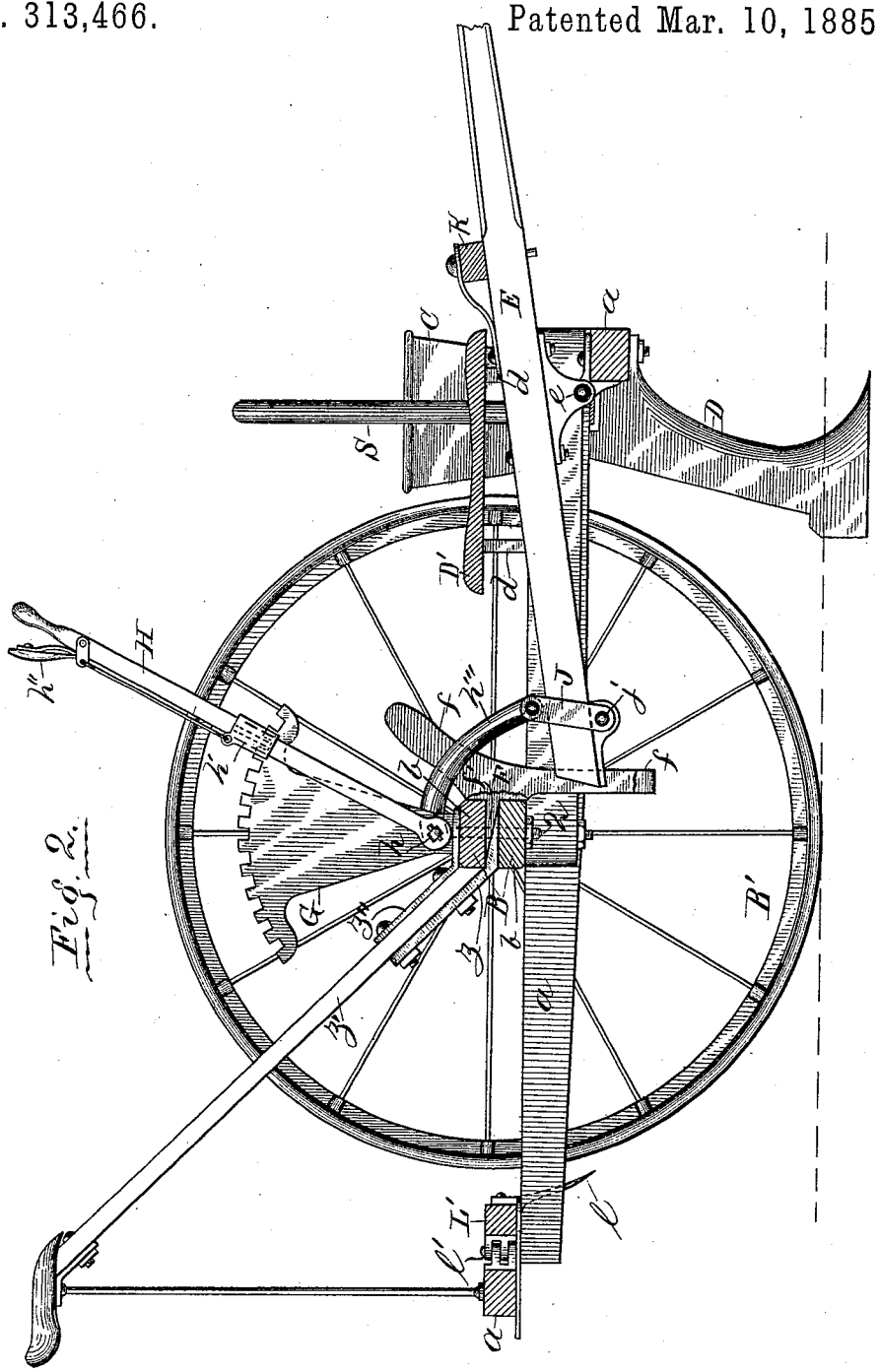
Figure 3:
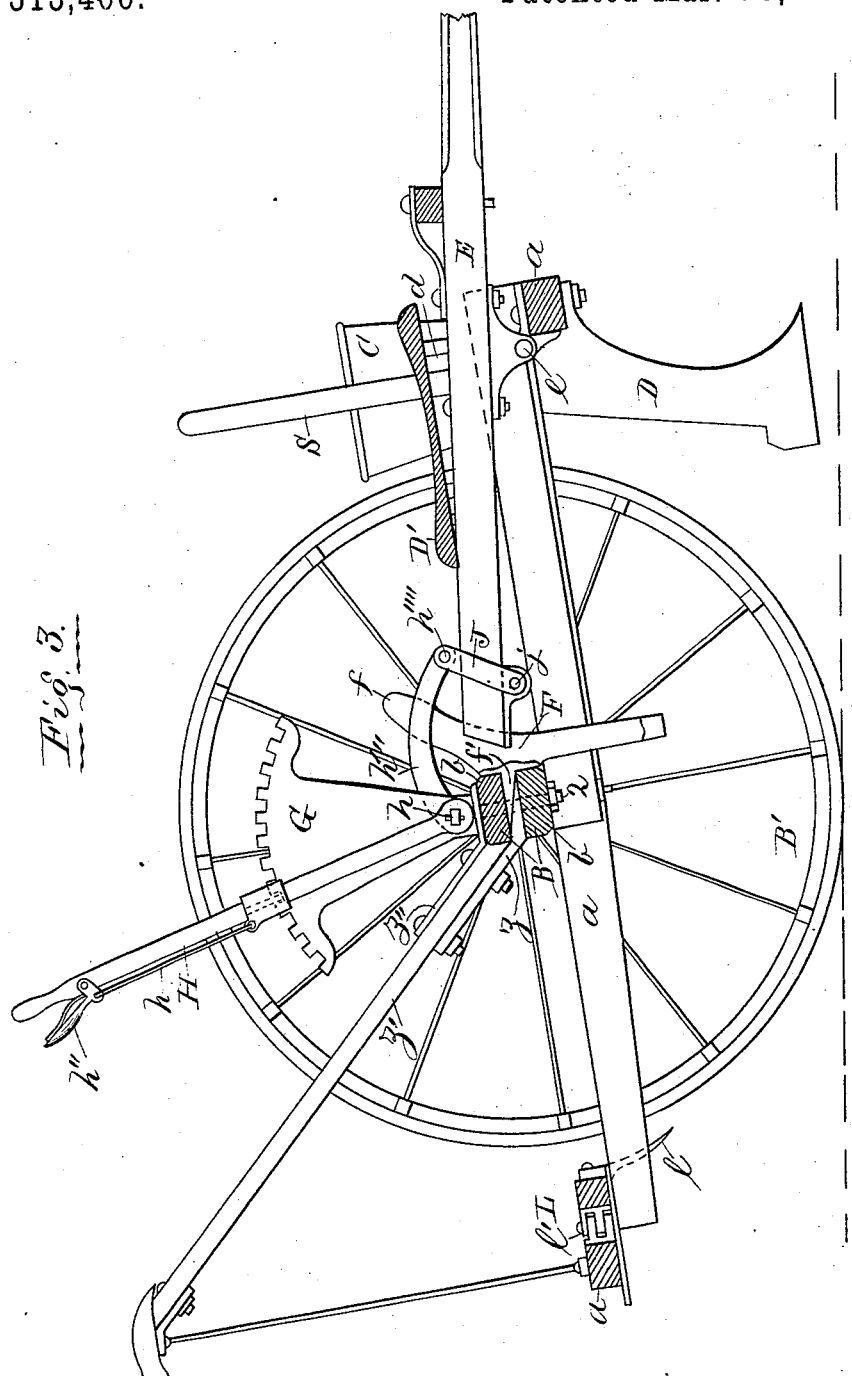

Figure 1 is a top plan, partly broken away, of a corn-planter embodying my improvements. Fig. 2 is a sectional elevation in the line $x\,x$ in Fig. 1, showing the planter in position for planting. Fig. 3 is a sectional elevation in same plane as Fig. 2, but showing the planter with the runners elevated above the ground. Fig. 4 is an enlarged sectional elevation of the seed-box and seed-tube and seed measuring and discharging devices, including the cut-off and the cap. Fig. 5 is a perspective of the lower valve or discharge-valve in the seed-tube. Fig. 6 is an enlarged top plan of the seed-box, shown with its cover and the cap and cut-off removed. Fig. 7 is a perspective of one half or end of the scraper-bar.

My invention relates to corn-planters of that class in which the seed-boxes are carried on the same single rigid frame to which the supporting-wheels are journaled; and the invention consists in combinations and constructions hereinafter described.

Referring to the drawings by letters, the same reference-letter indicating the same part in the different figures, letter A represents a rectangular rigid frame, which I have shown as formed of bars $a$, but which may be formed in any desired manner.

B is the axle, securely bolted to the frame A near its longitudinal center, and B' are the supporting-wheels, journaled on the ends of the axle B.

C are the seed-boxes, and D the seed-tubes. Both seed-boxes and runners are fixed to the forward ends and sides of the frame A. The lower ends of the seed-tubes may be provided with any kind or style of runner desired.

D' is the dropman's seat, located on the frame A between the seed-boxes C, and supported on standards $d$.

E is the tongue or draft-pole, hinged at $e$ to the forward transverse bar of the frame A, as shown at Figs. 2 and 3 of the drawings, so that it may swing in a vertical plane. The end of the tongue in rear of the hinge $e$ extends nearly to the axle B, where it is received between the projecting sides or guides $f$ of a frame, F, which is bolted to the front side of the axle in such manner as to hold the rear end of the tongue firmly against lateral movement, while it permits it to swing freely in a vertical plane, and thus by making the tongue very rigid laterally means are provided for guiding the planter with certainty, which has been a difficulty in this class of planters, especially after the hinge $e$ has become loose from wear or other causes.

G is a segment rack-bar, fixed to the axle A.

H is a hand-lever, fixed at its lower end to a shaft, $h$, and provided with an ordinary pawl, $h'$, which engages with the rack G, and is operated by an ordinary thumb-latch, $h''$. The shaft $h$ is journaled in a bearing, I, which is fixed to the axle B, and its end $h'''$ distant from the lever H is bent, extends forward, and is provided at its forward end with trunnions or projections $h''''$, which are hinged or journaled to the upper ends of the side arms of a stirrup, J, which extends below the tongue, and is hinged or journaled at its lower end to the lower side of the tongue at $j$.

By means of the lever H the rear end of the tongue may be raised and lowered as desired, as will be seen by reference to Figs. 2 and 3, and by means of raising and lowering the tongue at its rear end, as described, the forward end of the planter may be raised and lowered to adjust the depth of planting, to lock the runners into the ground, as shown at Fig. 2, and to raise and hold the runners out of the ground, as shown in Fig. 3.

By reason of the lever H being hinged on the axle or fulcrum on which the frame A swings, the frame is not only easier raised and lowered than when this lever is fulcrumed at a point forward of the axle, but by hinging the lever at this point the forward end of the frame A may be shortened and the seed-dropping devices be brought to the shortest distance possible from the supporting-wheels in this class of planter, with all the well-known advantages of so doing, and, further, the lever H be brought to a position easily accessible for the driver in his seat $a'$. Ordinary double and single tree draft devices K are mounted on the tongue, as shown.

L is the scraper-bar, provided with an ordinary scraper, $l$, at each end. The bar L is formed in two parts, L' L', each hinged to the rear bar, $a$, of the frame A by hinges $l'$, as shown at Figs. 1, 2, and 3, so that they may oscillate in horizontal planes, as shown by dotted lines at Fig. 1. Each bar L' L' is provided at its end next its fellow bar and on one of its sides with a projecting plate, $m$, having a slot, $m'$, in its outer end, (see Fig. 7,) and with a projecting stud on its other side. The plates $m$ are on the front side of one bar L' and on the rear side of the other bar, and the same is true of the lugs $m''$, so that the lug $m''$ of the one bar will enter the slot $m'$ of the other, as shown at Fig. 1.

By means of the connection of the bars L' last described, when the outer end of one of said bars is drawn forward, the other will also be drawn forward, whereby both may be operated to operate the scrapers simultaneously by means of the ordinary foot-lever N and connecting-rod $n$. The seed-slides P, with seed-cups $p$, connecting-rod Q, operating-lever S, cap T, cut-off U, and bottom plate, V, with holes $v$, are of ordinary construction, and need not be any more fully herein described.

W is the lower valve, hinged at $w$, one in each seed-tube, so that it may oscillate in a vertical plane lengthwise of the planter. The upper end, $w'$, of the valve W extends from its fulcrum upwardly to about the same plane as the seed-slide P, and from the same fulcrum its lower end extends in a thin plate, $w''$, (see Fig. 5,) forward, and thence in a flat plate, $w'''$, about as broad as the seed-tube, down to near the lower end of the seed-tube, where it is bent and turned rearwardly, as shown plainly at Figs. 4 and 5.

Z is a link with its ends bent downwardly and inserted loosely, one end in a recess or hole in the seed-slide P, and its other end in a recess or hole in the upper end of the valve W. The link Z is of a length equal to the distance between the holes which receive it in the slide P and valve W when the upper end of said valve is swung to its extreme limit rearwardly of the planter; hence the ordinary reciprocating movement of the seed-slide will impart the swinging or oscillating movement to the valve W, hereinbefore described, as indicated by dotted lines at Figs. 4 and 6, and the movements of the valve W will be so timed with reference to the discharges of seed into the seed-tube from the slide P that the lower end of the valve W will be in position, as shown by full lines at Fig. 6, to receive and retain each charge of seed, and will be swung forward, as shown by dotted lines at same figure, in order to discharge the contained charge of seed at the proper and desired time.

As a means of strength, compactness, and cheapness of construction I form my axle in two parts, $b\ b$, (see Fig. 3,) arranged a short distance apart, so that they may receive between them a projection, $f'$, from the rear side of the plate F and the lower end of a plate, $z$, to which the lower end of a seat-supporting bar is bolted. A plate, $z''$, is bolted to the upper side of the seat-supporting bar, and extends forward over the axle, and a bolt, 2, extending downward through the plate $z''$, axle B, bar $z'$, and plate $z$, secures all firmly together. The journals for the wheels B' are flattened at their inner ends, and these flattened ends rest between the bars $b\ b$, and are secured therein by bolts, as shown.

I do not herein make any claim to the check-row attachment shown originally in the application for this patent, as I intend making a separate application for the same.

Having thus described my invention, what I claim as new, and desire to secure by Letters Patent, is—

1. In a corn-planter, in combination with the reciprocating seed-slide and cut-off, a swinging valve in the seed-tube, and a link, Z, connecting the seed-slide and the upper end of the said swinging valve, and adapted to oscillate said valve rearward and forward, or two full throws, at each throw of the seed-slide in one direction, substantially as described.

2. The scraper-bar L, formed in two parts, each part hinged to the rear transverse bar of the planter, and the parts hinged at their adjacent ends to each other, whereby operating one of said parts will simultaneously operate the other, substantially as and for the purpose specified.

3. In a corn-planter, in combination with the main frame and supporting-wheels, a scraper-bar formed in two parts, L' L', hinged to each other and to the main frame, substantially as described, a lever and connecting-rod connected with one part L' and adapted to operate both parts L', substantially as and for the purpose specified.

4. In a corn-planter, in combination with the frame A and tongue, hinged thereto substantially as described, the axle B, formed in two parts, $b\ b$, the plate F, having a plate, $f'$, extending into and between the parts $b$, and secured therein by a bolt, substantially as and for the purpose specified.

5. In a corn-planter, in combination with the frame A and tongue, hinged thereto substantially as described, the axle B, formed in two parts, $b\ b$, the plate F, having the plate $f'$, extending into and between the parts $b$, and the part $z$, secured to the seat-bar, and also extending into and between the bars $b$, and secured by a bolt, substantially as and for the purpose specified.

6. In a corn-planter, in combination with a main frame supported on wheels, and carrying the seeding devices and furrow-openers at its forward end, and a tongue pivoted to the forward end of said frame and extending rearwardly to near the axle, a hand-lever fulcrumed on the axle, and adapted to raise and lower and depress the forward end of the planter, substantially as and for the purpose specified.

7. In a corn-planter, in combination with a main frame supported on wheels, and carrying the seeding devices and furrow-openers at its forward end, a hand-lever fulcrumed on the axle and adapted to raise and lower and depress the forward end of the planter, and a tongue pivoted to the forward end of said frame and extending rearwardly to near the axle, a plate, F, provided with guard-flanges $f$, which permit of vertical flexure of the tongue and frame, but hold the parts securely in a lateral position, substantially as and for the purpose specified.

8. In a corn-planter, in combination with a main frame supported on wheels, and carrying the seeding devices and furrow-openers at its forward end, and a tongue pivoted to the forward end of said frame and extending rearwardly to near the axle, a hand-lever fulcrumed on the axle and adapted to raise, lower, and depress the forward end of the frame, and to engage with a rack-bar, whereby the seeding devices may be locked into or out of the ground, substantially as and for the purpose specified.

9. In combination, the frame A and seeding devices, tongue E, hinged to forward end of frame A and projecting rearwardly to near the axle, lock-lever H, shaft $h$, having arm $h'''$, stirrup J, hinged to tongue and to arm $h'''$, and plate F, having tongue-guards $f$, substantially as and for the purpose specified.

In testimony whereof I affix my signature in presence of two witnesses.

ABRAHAM ANDERSON.

Witnesses:
STRAWTHER GIVENS,
EDWARD P. WILLIAMS.

Corrections in Letters Patent No. 313,466.

It is hereby certified that in Letters Patent No. 313,466, granted March 10, 1885, upon the application of Abraham Anderson, of Galesburg, Illinois, for an improvement in "Check-Row Corn-Planters," the names of the assignees were written and printed "C. S. Colton, G. D. Colton and F. Colton," instead of *G. D. Colton and Company;* whereas the said Letters Patent should have been issued to *G. D. Colton and Company, its successors and assigns;* that the proper corrections have been made in the files and records pertaining to the case in the Patent Office, and should be read in the Letters Patent that the same may conform thereto.

Signed, countersigned, and sealed this 28th day of July, A. D. 1885.

[SEAL.]

H. L. MULDROW
*Acting Secretary of the Interior.*

Countersigned:
    M. V. MONTGOMERY,
        *Commissioner of Patents.*